United States Patent

[11] 3,622,894

[72] Inventors: Robert F. Heidecker;
Richard G. Laatt, both of Longmont, Colo.
[21] Appl. No. 95,784
[22] Filed Dec. 7, 1970
[45] Patented Nov. 23, 1971
[73] Assignee International Business Machines Corporation
Armonk, N.Y.

[54] PREDETECTION SIGNAL COMPENSATION
17 Claims, 3 Drawing Figs.
[52] U.S. Cl. ............................................. 328/162,
179/100.2 K, 328/157, 328/163, 328/165,
340/174.1 B, 340/174.1 H
[51] Int. Cl. ............................................. H04b 15/00
[50] Field of Search ............................................. 179/100.2
K; 307/216, 218, 243; 328/135, 146, 157, 158,
162, 163, 165; 340/174.1 B, 174.1 H

[56] References Cited
UNITED STATES PATENTS
3,067,422 12/1962 Hunt .................... 340/174.1 H
3,146,430 8/1964 Burke .................... 340/174.1 H
3,521,041 7/1970 Van Blerkom et al. ...... 328/165 X
3,524,164 8/1970 Cox et al. ................ 340/174.1 H
3,539,824 11/1970 Yu et al. .................. 307/218

Primary Examiner—Stanley D. Miller, Jr.
Assistant Examiner—R. C. Woodbridge
Attorneys—Hanifin and Jancin and Herbert F. Somermeyer ABSTRACT: A periodic signal has information-bearing signal changes subject to undesired perturbations (such as peak shift) which degrade detection of the information. First and second intermediate signals are generated from the periodic signal. One of the intermediate signals is compensated for such undesired perturbations. Signal characteristics of the periodic signal are analyzed for determining the likelihood of such undesired perturbations. Based upon the analysis, either the first or second intermediate signal is selected for detection purposes. In a preferred form, the readback signal, delayed by one-half cell period, is used as an uncompensated signal. Signal amplitudes of the periodic signal are compared at points separated by one cell period. If the amplitudes are substantially different, then the peak-shift compensated signal is selected as the output signal. At all other times, the one-half-cell delayed signal is used as the output signal.

INVENTORS
ROBERT F. HEIDECKER
RICHARD G. LAATT

ATTORNEY

PREDETECTION SIGNAL COMPENSATION

BACKGROUND OF THE INVENTION

The present invention relates to circuits and methods for compensating errors in signals and more particularly to compensation of signals associated with magnetic recording and data communication systems.

In data channels, such as magnetic recording systems, information is represented by various forms of encoding; for example, phase encoding, NRZI, double frequency encoding, pulse width modulation and the like. Such systems are characterized by signals having different one-half wavelengths in a closely associated relationship. When a short-duration one-half wavelength is immediately adjacent a long-duration one-half wavelength, peak shift tends to shorten the longer one-half wavelength. This causes a time perturbation of the information-bearing portions of the signal resulting in degraded detection. Also, as one-half wavelengths vary in length, the AC base line shifts causing time perturbations in the information-bearing portions of such signals. Compensation for such errors often introduces other perturbations into the compensated signal. For example, pulse-slimming techniques, (used for peak-shift compensation) introduce base line crossover problems. This crossover introduces false transitions which may be interpreted by detection circuitry as spurious information. This, of course, is to be avoided. The described problems are particularly acute in the higher density recording schemes such as in 1,600 bits per inch phase encoded recording. Such errors are also found in data-processing channels other than those using magnetic media. Various schemes and techniques have been used in compensating signals for the above referred-to perturbations, as well as other perturbations.

In detection of information from an information-bearing signal, the identification of the cell period is a critical operation. In many data-processing channels the signal is designed to be self-clocking —that is, timing (cell period identification) is derived from the signal being processed. Such self-clocking techniques include dual channel detection circuits wherein one channel processes the signal to be detected and a second channel generates a timing signal which is compared with the processed signal. As a result of the comparison, the information is recovered. Such systems while effective in many instances are still subject to errors because of above-described perturbations.

Compensation for such perturbations has included generation of two signals and combining same on a time-slot basis depending on whether or not the perturbation is in the signal. This is useful for eliminating noise spikes and the like but unfortunately is not effective for eliminating peak shift without base line errors or for eliminating base line shift errors. It is not always possible to clearly and precisely define the perturbation in this manner.

SUMMARY OF THE INVENTION

It is an object of the present invention to provide improved detection signal processing to compensate for undesired perturbation in a signal being processed.

According to the present invention, a signal being processed is analyzed as to its one-half wavelength characteristics with respect to information bit periods therein. The signal being processed is first compensated for an undesired perturbation such as peak shift, phase shift, base line shift, and the like. This action results in a first intermediate signal. A second intermediate signal is derived from the signal being processed which is not compensated in that manner. Based upon the analysis of the signal being processed, particularly by comparing the amplitudes at one cell-period spaced-apart locations, either the compensated signal or the other signal is selected as an output signal. The output signal is supplied to an information detection system.

In one embodiment, when the amplitude is different at one-cell spaced-apart points on the readback signal the compensated signal is selected as the output signal. These two selected signals are combined to provide a single output signal to an information detector.

According to one aspect of the present invention, a logic EXCLUSIVE-OR circuit compares the amplitudes of limited versions of the signal being processed at one-cell spaced-apart points. Based upon that comparison, the first compensated signal or the second intermediate signal is selected in accordance with the above-stated rule. In a more limited aspect of the invention, the selection of the compensated signal and the second intermediate signal is overlapped to ensure no glitches in the output signal. A glitch is defined as a spurious amplitude variation.

Another aspect of the invention, the cell period is divided into two halves. The signal amplitudes at the extreme ends of the halves are used to select which of the intermediate signals is to be the output signal. The signal appearing at one-half of the one-cell span is used as the second intermediate signal.

In a specific version of the invention, in a magnetic recording system, the readback signal is differentiated and then delayed through two one-half-cell delay devices which delay may be coordinated with velocity of the moving media. An analog adder subtracts a portion of the amplitude at the one-cell spaced-apart location from the full signal amplitude of a one-half-cell delayed signal for peak-shift compensation. The output signal of the analog adder is hard limited to form a two distinct state signal. A one-half-cell delayed signal is hard limited and used as an uncompensated or second intermediate signal. The signals at the cell spaced-apart points are hard limited and then exclusive OR'd to form a gating signal. The inverted gating signal having two distinct states is broadened using delay means to ensure that the limited peak-shift compensated signal and the uncompensated signal are gated in an overlapping manner to avoid glitches. All gating is performed on a two distinct state signal basis. The only analog operation performed is in the compensation portion of one branch of the signal processing circuit.

The foregoing and other objects, features, and advantages of the invention will be apparent from the following more particular description of preferred embodiments of the invention, as illustrated in the accompanying drawings.

THE DRAWINGS

DETAILED DESCRIPTION OF THE PREFERRED EMBODIMENT

Figure 1:
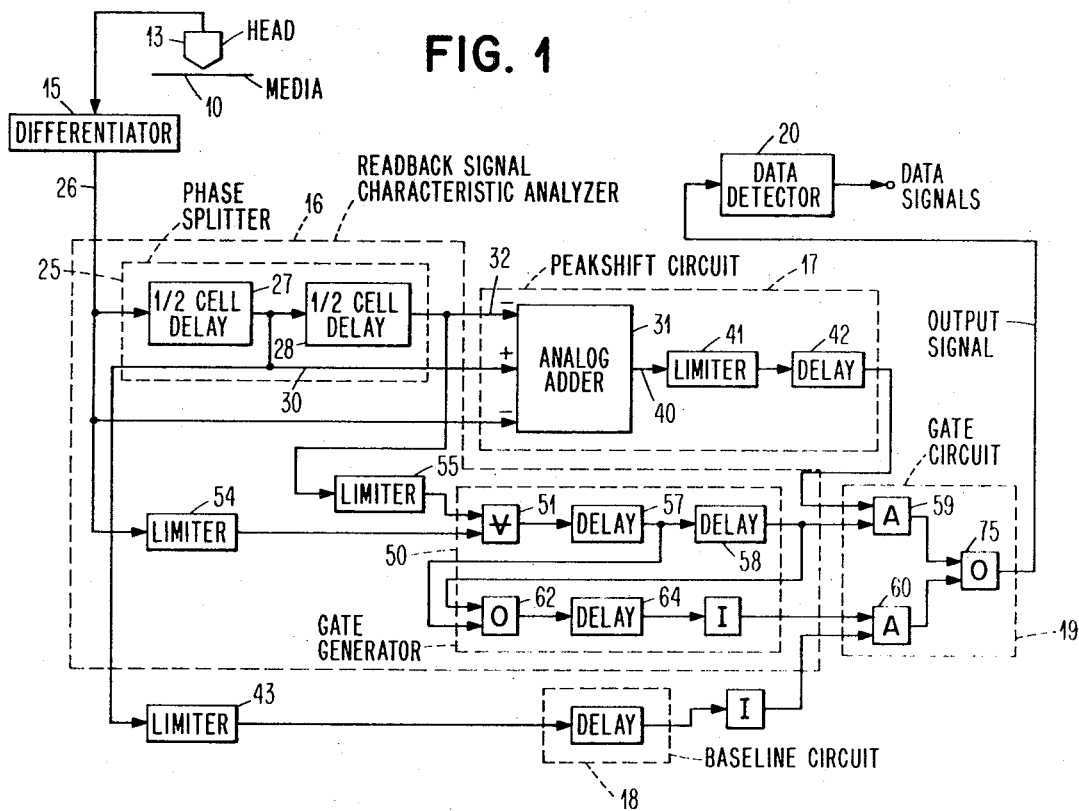
FIG. 1 is a simplified block diagram of the preferred embodiment of the invention.

A magnetic recording system of the self-clocking type has a high recording density on magnetic media 10. Due to the characteristics of the media recorded signal 11 having information-bearing signal state changes is subject to readback signal peak shift (a shift of the location of state changes in signal 11 appears as peak shift in a readback signal which is the differential of signal 11). The idealized readback signal 12 shows that peaks of the readback signal corresponding to the recorded flux transitions are shifted in time in accordance with the permutations of one-half wavelengths as is well known in the magnetic recording art. Transducer 13 senses the recorded flux on media 10 and supplies readback signal 12 to differentiator 15. Differentiator 15 supplies a differentiated but analog signal to readback signal characteristic analyzer 16. Analyzer 16 not only analyzes the one-half wavelength characteristic of signal 12 but supplies partially processed signals to peak-shift circuits 17 for peak-shift compensation and another signal to baseline circuit 18. Based upon the comparison of the one-half wavelength characteristics of the readback signal, either the compensated intermediate signal supplied by circuit 17 or the baseline circuit 18 signal is supplied through gate circuit 19 to data detector 20. In accordance with the signal selection criteria, baseline circuit 18 supplied signal has desirable peak-shift characteristics as well as desirable baseline characteristics.

In many peak-shift compensation techniques, such as those using pulse-slimming, baseline properties are degraded to such an extent that during long wavelengths of the signal being processed the signal may recover beyond the baseline to provide spurious zero crossings falsely indicative of record flux state changes. It is the purpose of the FIG. 1 illustrated embodiment to provide highly desirable peak-shift compensation and yet provide a signal to data detector 20 which has highly desirable baseline characteristics; in other words, an output signal to be detected which is as nearly as possible a true replica of the recording signal 11. For purposes of illustration, data is represented as in NRZI signal. The second cell boundaries are indicated by the carets at the top of HFIG. 2. The signal state changes are ideally at cell centers. Data detector 20 may use any well-known or other data detection techniques, such as integration techniques, time slot detection, differentiation detection techniques, and the like.

Figure 2:
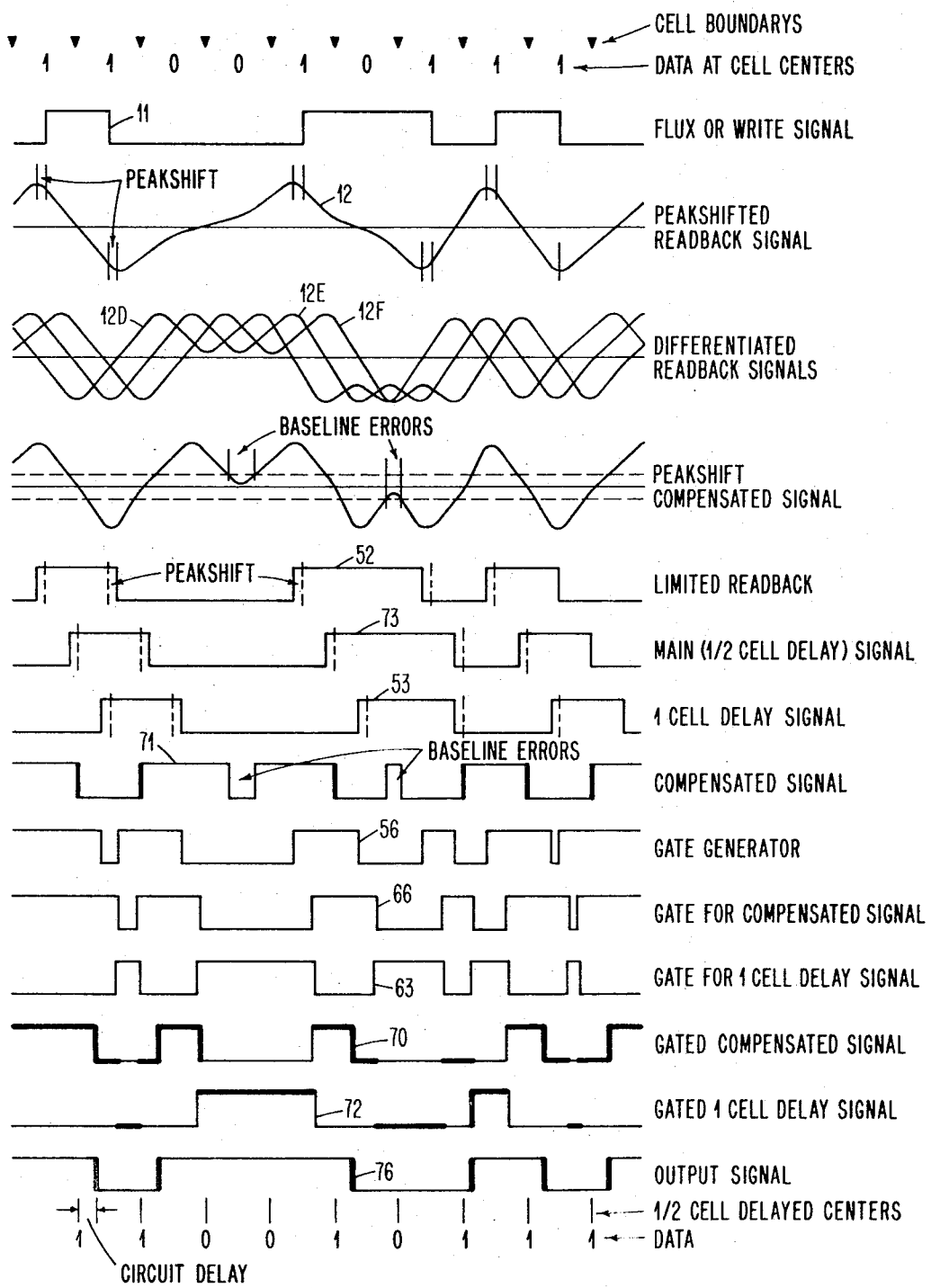
FIG. 2 is a set of idealized waveforms used in description of FIG. 1 illustrated embodiment.

Readback signal characteristics analyzer 16 includes phase-splitting readback signal 12D by splitter 25. Differentiated readback signal 12D on line 26 is delayed by one-half-cell delay 27 and then delayed another one-half cell by delay 28 to provide three signals 12D, 12E, and 12F spaced apart in time by one-half cell. This time period, of course, is a function of media 10 velocity with respect to transducer 13. Each time period is the time transducer 13 takes to scan magnetic media between a cell boundary indicated in FIG. 2. Adaptive delay lines may be used such that the delays provided in splitter 25 relate to velocity of media 10.

Figure 3:
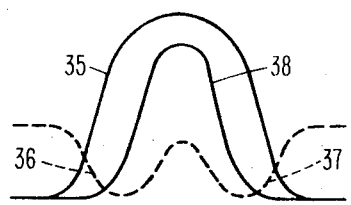
FIG. 3 shows an idealized set of signal waveforms illustrating pulse-slimming techniques.

Phase-split signals from circuit 25 are not only used in the selection of the intermediate signals, but also used to accomplish peak-shift compensation. The one-half-cell delayed signal on line 30 is supplied as a positive input to analog adder 31 in peak-shift circuit 17. The one-cell delayed signal on line 32 is supplied as a subtractive reduced amplitude analog input to adder 31. In one embodiment of peak-shift correction by pulse slimming, the signal on line 30 had full amplitude while the sum of the signals at the subtractive inputs had a reduced amplitude of 0.4. FIG. 3 illustrates the operation of analog adder 31. The main signal 35 being processed on line 30 is compared with signal 36 from lines 32 and signal 37 from line 26. The analog sum of the three signals is a pulse-slimmed output signal 38 on line 40. Internal operation of analog adder 31 is well known and will not be further described for that reason.

Pulse-slimmed signal 38 is hard limited in limiter 41 and delayed in delay 42 for being supplied to gate circuit 19. Delay 42 balances all the circuit delays such that the compensated signal reaches gate circuit 19 in timed relation to the gate signal and the baseline circuit signal. Delay circuit 42 may be chosen to have the same temperature drift as amplifiers in the later-described delays and other portions of the circuit. In this manner, the circuit becomes insensitive to temperature variations insofar as timing relationships are concerned.

The uncompensated or second intermediate signal is generated by limiting the one-half-cell delayed signal on line 30, then delaying it through baseline circuit 18 such that it appears at gate circuit 19 simultaneously and in one-half-cell relationship with respect to the output signal of circuit 17. It is limited in amplitude to two distinct states by limiter 43.

The signals on lines 26 and 32 have a timed relationship of one cell period apart. These two signals are continuously compared in gate generator circuit 50 to selectively activate gate 19 to pass either the peak-shift compensated signal or the second intermediate signal. In circuit 50, EXCLUSIVE-OR circuit 51 receives limited signals 52 and 53 respectively from limiters 54 and 55. The EXCLUSIVE-OR output of circuit 51 is gate generator signal 56. This signal is further delayed through delay 57 and 58 generating signal 66 for controlling AND-circuit 59. Again, delays 57 and 58 compensate for different circuit delays in other portions of the system.

It is desired to gate a larger portion of the second intermediate signal from circuit 18 to avoid glitches; that is, even though there are compensating delays, there may be slight variations such that the gating signals supplied to AND-circuits 59 and 60 are somewhat separated to form a glitch or noise signal. Accordingly, the output of delay 57 is combined with the output signal of delay 58 in OR-circuit 62. This signal is further delayed by delay 64 and inverted to generate signal 63 for controlling AND-circuit 60. Delay 64 is about one-half the delay 58. This delay prevents glitches. Note that signals 63 and 66 are essentially complements except for the delays and extended durations of the positive portions of signal 63 as compared with the negative portions of signal 66. Signal 63 positive portion is the positive logical sum of signals 56 and 66.

The useable output signal of AND-circuit 59 is signal 70 heavy line portions. This corresponds to the AND condition of the positive portions of signal 66 and limited peak-shift compensated signal 71. In a similar manner, the usable output of AND-circuit 60 is signal 72 wherein the heavy line portions represent the usable AND condition of the positive portions of gate signal 63. Signals 70 and 72 are combined in logic OR-circuit 75 forming output signal 76 which is supplied to data detector 20. It should be noted that signal 76 is a replica of write signal 11.

Comparison of compensated intermediate signal 71 and output signal 76 shows that baseline errors caused by baseline crossover from analog adder 31 have been eliminated. The peak-shift corrected transitions indicated in signal 71 by the heavy vertical lines are maintained in signal 76. The desirable baseline characteristics of the limited main (one-half cell delayed) signal 73 are also supplied in output signal 76. This combination provides improved reliability and fidelity of information recovery by data detector 20.

While the invention has been described with respect to the magnetic media system having undesired peak-shift perturbations, no limitation thereto is intended. It is understood that the process, methods, and techniques of this invention may be utilized in any form of digital data channels so long as limited signals can be utilized in the information recovery circuits which may receive compensated signals.

While the invention has been particularly shown and described with reference to preferred embodiments thereof, it will be understood by those skilled in the art that various changes in form and details may be made therein without departing from the spirit and scope of the invention.

What is claimed is:

1. Signal processing for an information-bearing signal having information cell periods, said information signal being subject to undesired perturbations,
   improved signal processing including the combination,
   generating first and second intermediate signals, said first signal being compensated for said undesired perturbations whether or not such perturbations actually exist in said information-bearing signal,
   analyzing said information-bearing signal at points spaced in time by said information cell period and selecting portions of said first and second intermediate signals as an output signal in accordance with predetermined characteristics of said information-bearing signal which indicate whether or not such undesired perturbations are likely to have occurred.

2. The signal processing set forth in claim 1 wherein said characteristic is amplitude comparisons of the information-bearing signal wherein a difference in amplitude dictates selection of the first compensated signal as the output signal.

3. The signal processing set forth in claim 1 wherein said undesired perturbation is peak-shift within said information-bearing signal, said first signal being continually compensated for said peak shift and said signal receiving no compensation.

4. The signal processing as set forth in claim 3 wherein said peak-shift compensation includes analog subtraction of a portion of a one-cell delayed signal and a current readback signal from a one-half-cell delayed signal such that during lone one-half wavelengths in said information-bearing signal a baseline recovery may occur generating undesired zero crossovers, said second signal being said current information-bearing signal delayed in accordance with the processing time for said peak-shift compensation.

5. The signal processing set forth in claim 4 wherein said information-bearing signal is a readback signal in a magnetic media recording system and information is represented therein by transitions in signal states of recorded flux on said media, said readback including differentiating said readback signal for providing zero crossovers and hard limiting said signals subsequent to peak-shift compensation and before comparing same to generate a selection signal for selecting either a peak-shift compensated signal or a delayed uncompensated signal, said delayed uncompensated signal also being hard limited before being selected.

6. The signal processing set forth in claim 5 wherein said limited peak-shift compensated signal is selected whenever the polarity of the cell delayed signal and the undelayed signal are different and said uncompensated signal selected whenever the one-cell delayed signal and the current signal are the same.

7. The signal processing set forth in claim 6 wherein the selection of the uncompensated second signal overlaps the selection of the peak-shift compensated signal.

8. The signal processing set forth in claim 6 wherein the signals used for peak-shift compensation are derived in the same manner as for the selection signals.

9. The processing of an information-bearing signal having cell times defining successive information indicating portions, the improved signal processing including the combination, compensating said information-bearing signal for peak-shift errors resulting from undesired peak shift including processing said signal to produce a first intermediate signal having baseline crossover perturbations which may introduce false information into the signal, delaying said information-bearing signal by one of said cell durations, hard limiting said delayed signal, hard limiting said information-bearing signal, and EXCLUSIVE-OR comparing said one-cell time delayed hard limited signal and said other hard limited signal and selecting that peak-shift compensated signal as an output signal when the EXCLUSIVE-OR relationship is satisfied and selecting the one-cell delayed signal when said EXCLUSIVE-OR relationship is not satisfied.

10. Signal transition adjustment for an information-bearing signal having transitions of signal states and being subjected to undesired perturbations which alter the time of occurrence of transitions, the signal transition adjustment including the combination, defining a repetitive cell period duration for said information-bearing signal, adjusting transitions of said signal in accordance with changes in one-half wavelengths in said signal to generate a first intermediate signal having adjusted transitions, generating a second intermediate signal not having its transitions so adjusted, selecting transitions from either said first or second intermediate signal as information representing transitions in accordance with predetermined wavelength characteristics of said information-bearing signal and generating an output signal including said selected transitions.

11. The adjusting set forth in claim 10 wherein said wavelength determinations are made in accordance with said information signal being sampled at points spaced apart in accordance with said cell period durations.

12. A predetection signal processor for an information-bearing signal representing data encoded therein in successively occurring cell periods having predetermined durations, the improvement including the combination:

cell period means supplying first, second, and third signals derived from said information-bearing signal respectively representing a current signal, a one-half period delayed signal and a full period delayed signal, respectively;

compensation means receiving said first, second, and third signals and including arithmetic means for producing a first intermediate signal in accordance with predetermined amplitude relationships between said first, second, and third signals for compensating certain undesired perturbations but with generating possible other perturbations having a degrading effect on signal fidelity;

means for converting said second signal to a second intermediate signal;

gate signal generating means responsive to said first and third signals to generate gate signals indicating the EXCLUSIVE-OR signal polarity relationship thereof;

gating means being responsive to said gate signals and said intermediate signals to supply an output signal for detection consisting of selected portions of said first intermediate signal when receiving an EXCLUSIVE-OR indication and portions of second intermediate signals when the EXCLUSIVE-OR relationship is not satisfied.

13. The subject matter of claim 12 including separate limiter means electrically interposed respectively between said peak-shift compensation means and said gating means, between said cell period means and said gate generating means such that said gating means and said gate generating means operate in a digital manner.

14. The apparatus of claim 13 wherein said peak-shift compensation means have a predetermined circuit delay, delay means delaying said intermediate signal such that the second intermediate signal arrives in proper phase relationship at said gating means with said peak-shift compensated signal, delay means in said gate generating means delaying said EXCLUSIVE-OR output signal such that it has the proper phase relationship with said peak-shift compensated signal, further delay means connected to said EXCLUSIVE-OR circuit and including inverter means for supplying a complement gate signal to said gating means for selectively gating said second intermediate signal as an output signal, said gating means including OR circuit means logically combining said gated peak-shift compensated signal and said gated second intermediate signal.

15. The apparatus set forth in claim 14 wherein said delay means for said gate signal supplies two time-spaced signals for supplying same with inversion as said complementary gate signal such that the gating means selects said second intermediate signal in an overlapping manner with respect to said first intermediate signal.

16. Subject matter set forth in claim 15 wherein said apparatus is in a magnetic media recording system, differentiating means supplying a differentiated information-bearing signal to said cell measurement means such that the output signal of said apparatus is a replica of the signal recorded in said magnetic recording system.

17. Apparatus set forth in claim 14 wherein said gate generating means includes gate signal widening means such that said selected portions of said intermediate signals overlap and including timing means for establishing said overlap in time-spaced relation to expected information-bearing signal state changes.

* * * * *